M. P. McCULLOCH.
IRRIGATION SYSTEM.
APPLICATION FILED SEPT. 17, 1908.
970,383.
Patented Sept. 13, 1910.
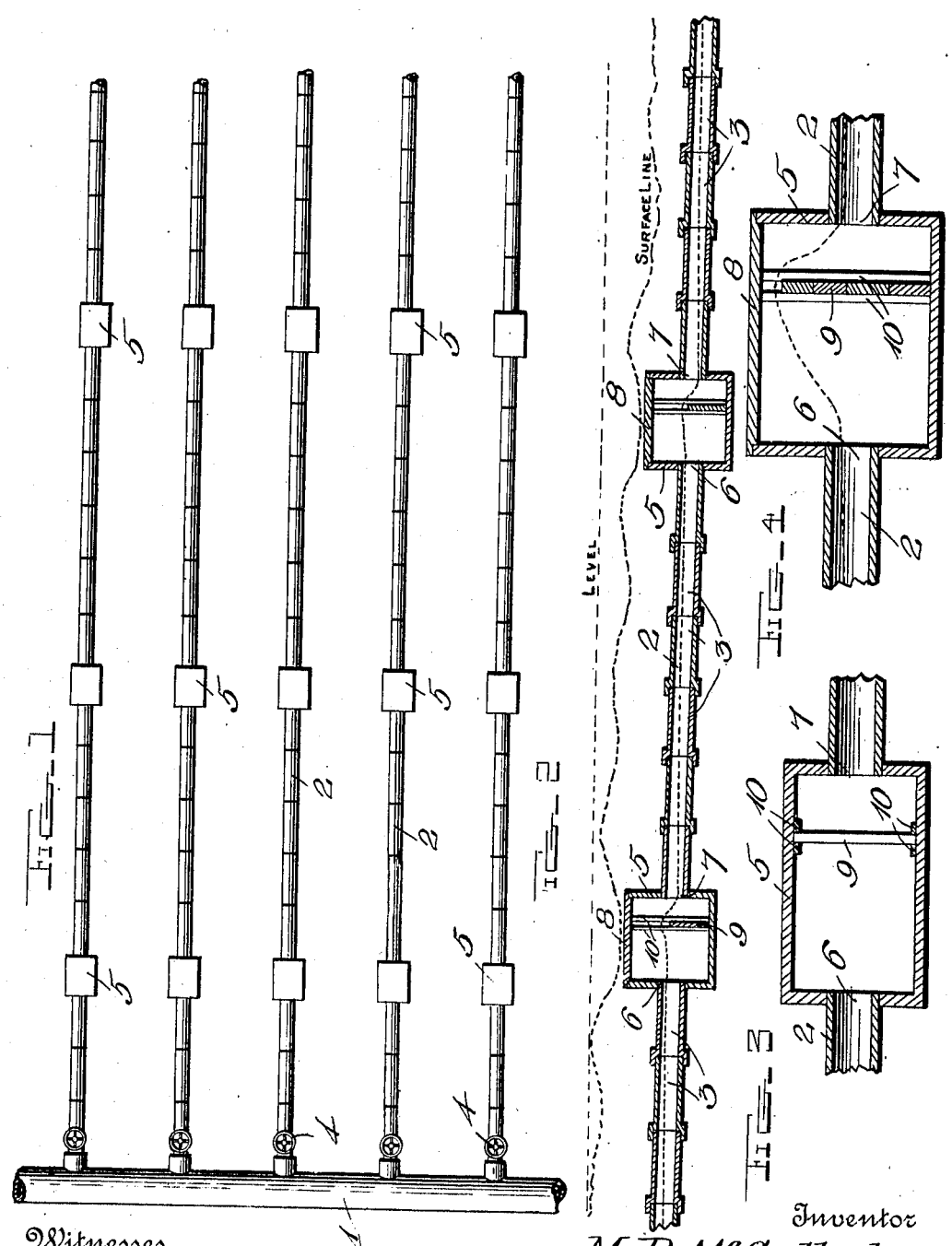
Witnesses
Inventor
M. P. McCulloch
by
Attorneys

UNITED STATES PATENT OFFICE.

MARSENA P. McCULLOCH, OF RED OAK, IOWA.

IRRIGATION SYSTEM.

970,383.  Specification of Letters Patent. Patented Sept. 13, 1910.

Application filed September 17, 1908. Serial No. 453,535.

*To all whom it may concern:*

Be it known that I, MARSENA P. McCULLOCH, a citizen of the United States, residing at Red Oak, in the county of Montgomery and State of Iowa, have invented certain new and useful Improvements in Irrigating Systems; and I do declare the following to be a full, clear, and exact description of the invention, such as will enable others skilled in the art to which it appertains to make and use the same.

This invention relates to improvements in irrigating systems.

The object of the invention is to provide a system of irrigation in which open ditches are dispensed with and the space usually occupied by said ditches utilized, thus providing for the cultivation of the entire surface of the irrigated section of ground.

A further object is to provide an underground water distributing system whereby the soil is irrigated from below, thus preventing a great waste of water which occurs in open-ditch systems from evaporation and other causes, and also preventing the soil from becoming packed and baked as frequently occurs from surface irrigation.

With these and other objects in view, the invention consists of certain novel features of construction, combination and arrangement of parts as will be described and particularly pointed out in the appended claim.

In the accompanying drawing, Figure 1 is a plan view of the improved irrigating system showing the arrangement of the main and branch and distributing pipes as laid beneath the surface of the soil; Fig. 2 is a longitudinal sectional view on a larger scale through a portion of one of the branch pipes; Fig. 3 is a horizontal sectional view through one of the silt basins or boxes; Fig. 4 is a longitudinal vertical sectional view through one of the silt boxes and the adjacent sections of the pipe connected thereto, showing a modified arrangement of the partition in the silt box.

Referring more particularly to the drawings, 1 denotes the main water supply pipe to which is connected at suitable intervals, a series of branch pipes, 2, which may be projected laterally at right-angles therefrom, as shown, or in any other desired direction. The branch pipes are constructed of a series of porous tiles, 3, through which the water running through the pipes passes and percolates through the ground, thus moistening and irrigating the soil. These branch pipes are inclined downwardly from the main pipe 1, as shown clearly in Fig. 2, and have formed therein, adjacent to their connection with the main supply pipe, cut-off valves, 4, by means of which the flow of water through the branch pipe may be regulated or entirely cut off from any branch pipe without interfering with the other branch pipes. This downward inclination of the branch pipes adapts them to be used as drain pipes for draining the land when the inlet and outlet openings in the silt boxes are arranged in alinement. At intervals along the length of each of the branch pipes are arranged silt boxes, 5, said boxes being preferably of oblong rectangular shape and preferably formed of cement or similar plastic material. An inlet aperture, 6, is formed in one end of the box, while in the opposite end and in line with the opening, 6, is formed a discharge opening, 7. The branch pipes are connected with the inlet and discharge passages whereby the water flowing through the pipes enters one end of the silt box and passes out into the pipes at the other end, while the sediment in the water is allowed to collect in the bottom of the box.

The boxes, 5, are provided with removable covers, 8, and in each of said boxes adjacent to the opposite ends thereof, is arranged a partition, 9, said partition being preferably removably engaged with the box and held in position therein by means of parallel guide strips, 10, secured to each side of the box, whereby when the cover is removed the partition may be readily slipped out of the box. The partitions, 9, are preferably formed of a series of separable sections whereby the overflow point from the inlet compartment of the box may be regulated by the height of the partition, thus holding back more or less water in the branch pipes, thereby causing a greater or less quantity to filter through the tiles and into the ground, thus forcing the water to rise nearer the surface of the ground where it is most needed.

In the arrangement of the box as shown in Fig. 4 of the drawings, the partition has been increased to such height that the water entering the silt boxes will rise nearly to the top of the same before flowing over the partition and escaping from the opposite end of the box. When the partition is thus arranged, the pipe connecting with the inlet end of each of the boxes will be filled to its greatest capacity, thereby greatly increasing the amount of water filtered therefrom.

In arranging the system for operation, the downwardly inclined branch pipes are laid only sufficiently deep to permit the proper cultivation of the soil so that the water filtered through the tiles forming the pipes will thoroughly irrigate the soil from beneath, thereby preventing the packing and baking of the soil, as frequently occurs with surface irrigation, and also preventing scalding. The inclination of the pipes also adapts them to be used for draining the land through which they pass when the inlets and outlets of the boxes are arranged above the overflow opening in the partition. The silt boxes may be arranged at any suitable distance apart which may be required by the grade of the land, it being evident that the greater the slope or incline of the ground, the closer together the basins or boxes would need to be placed in order to maintain an equal quantity of water standing in the branch pipes between the boxes.

In practice, the surface of the ground immediately over each box may be hollowed out to indicate the position of the box, or any other suitable means may be employed for this purpose so that any of the boxes may be readily found and the covers removed to ascertain the condition of the water or the amount of silt or sediment accumulated in the box. The partition is preferably arranged near the discharge end of the box to facilitate the insertion of a stopper in the inlet end thereof, thus cutting off the flow of water and enabling the box to be readily cleaned. By removing the partitions, an excessive amount of water can be quickly drained from a field.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim as new and desire to secure by Letters-Patent, is:

In an irrigation and drainage system, a main supply pipe, a plurality of branch pipes inclined downwardly from the main pipe, a plurality of silt boxes arranged at intervals in each branch pipe, a cover for each silt box, valves arranged in each branch pipe adjacent the main pipe for admitting or shutting off the flow of water into any of the branch pipes, and an adjustable sectional wall arranged in each of the silt boxes to hold back the flow of water in the branch pipe, substantially as described.

In testimony whereof I have hereunto set my hand in presence of two subscribing witnesses.

MARSENA P. McCULLOCH.

Witnesses:
L. F. QUERY,
F. L. INGMAN.